United States Patent [19]

Nilsen

[11] Patent Number: 4,524,575
[45] Date of Patent: Jun. 25, 1985

[54] WINDROW AERATOR

[76] Inventor: Arnold W. Nilsen, Box 20, Hazard, Nebr. 68844

[21] Appl. No.: 588,496

[22] Filed: Mar. 12, 1984

[51] Int. Cl.³ .............................................. A01D 79/02
[52] U.S. Cl. ....................................................... 56/372
[58] Field of Search ................. 56/372, 364, 344, 192, 56/366, 16.4, DIG. 1

[56] References Cited

U.S. PATENT DOCUMENTS

| | | | |
|---|---|---|---|
| 2,133,143 | 10/1938 | Innes | 56/364 |
| 2,529,422 | 11/1950 | Sampson | 56/372 |
| 2,729,047 | 1/1956 | Cheatum | 56/344 |
| 2,741,892 | 4/1956 | Collette | 56/372 |
| 3,178,876 | 4/1965 | Lundberg | 56/372 |

Primary Examiner—Jay N. Eskovitz
Attorney, Agent, or Firm—Paul H. Gallagher

[57] ABSTRACT

A frame mounted on wheels having a pickup head, with tines, lifting the windrow and moving it back. A lower roller with ribs is mounted rearwardly of the pickup head, and extending above it. An upper roller with ribs is mounted above, and partially forwardly of the lower roller, leaving a gap between the rollers through which the hay of the windrow passes. The pickup head and rollers are driven by p.t.o. drive from the drawing vehicle.

4 Claims, 6 Drawing Figures

WINDROW AERATOR

FIELD OF THE INVENTION

The invention relates in the field of making hay, and particularly handling it in windrows. After the hay is cut, it is formed into windrows which are necessarily higher and deeper than the cut hay in the normal distribution as grown, there being bare or vacant spaces between the windrows. The hay in the windrows, because of the depth of the windrows, sometimes dries slowly because it becomes matted or more compacted, as from rain or other causes, and it is desired to fluff it up, providing greater spaces between the stalks, and leaves, and greater aerating and consequent faster drying thereof.

OBJECTS OF THE INVENTION

A broad object of the invention is to provide a windrow aerator, and method relating thereto, having the following features and advantages:

1. It lifts the windrowed hay from the ground and fluffs it up to a high degree and replaces it back on the ground in the same general position it assumed before, that is, without turning or rolling or twisting it, without separating the leaves from the stalks, without bunching it, and without damaging it in any way such as by beating it or otherwise treating it roughly.

2. It is extremely simple in design and construction, thereby resulting in an implement that is inexpensive to make and requires a small amount of power to operate.

DESCRIPTION OF A PREFERRED EMBODIMENT

Figure 1:
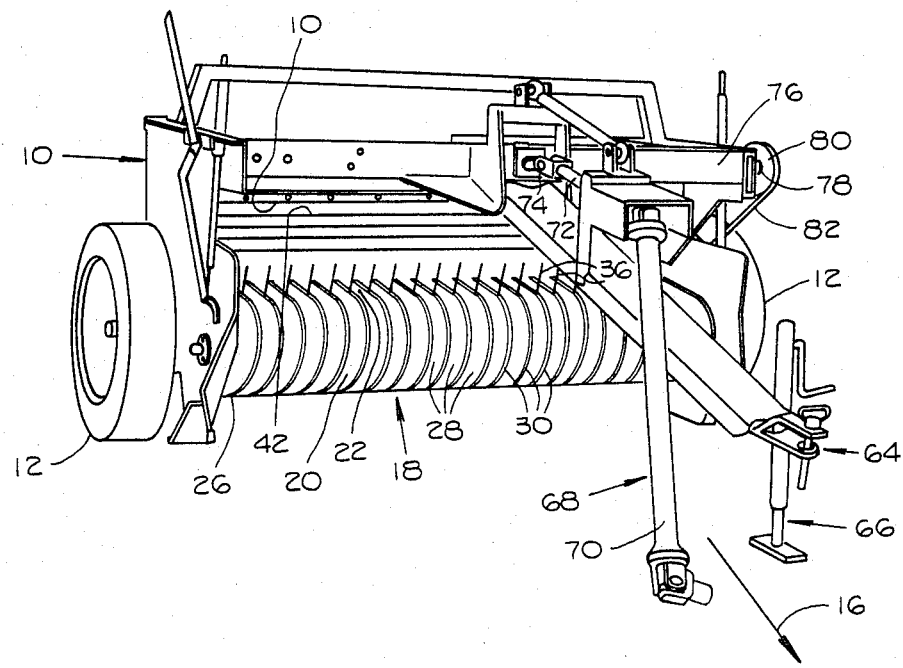
FIG. 1 is a perspective view of the windrow aerator of the invention, from the front and right.

Referring in detail to the drawings, the windrow aerator of the invention, which may also be referred to herein as an implement, includes a frame 10 of suitable construction, and on which the main operating components of the implement are mounted. The frame is mounted on wheels 12 which, in the orientation of the implement in its operation, are at the side, and which straddle the windrow indicated at 14, the implement moving in the direction of the arrow 16 in operation.

The implement includes a pickup head 18 which has a curved or cylindrical front end surface 20 and a top surface 22 leading rearwardly from the top of the cylindrical surface 20 and having a rear edge 24. The pickup head 18 includes an outer shell 26 formed of a plurality of transversely spaced strips or slates 28 forming slits 30 therebetween.

Figure 3:
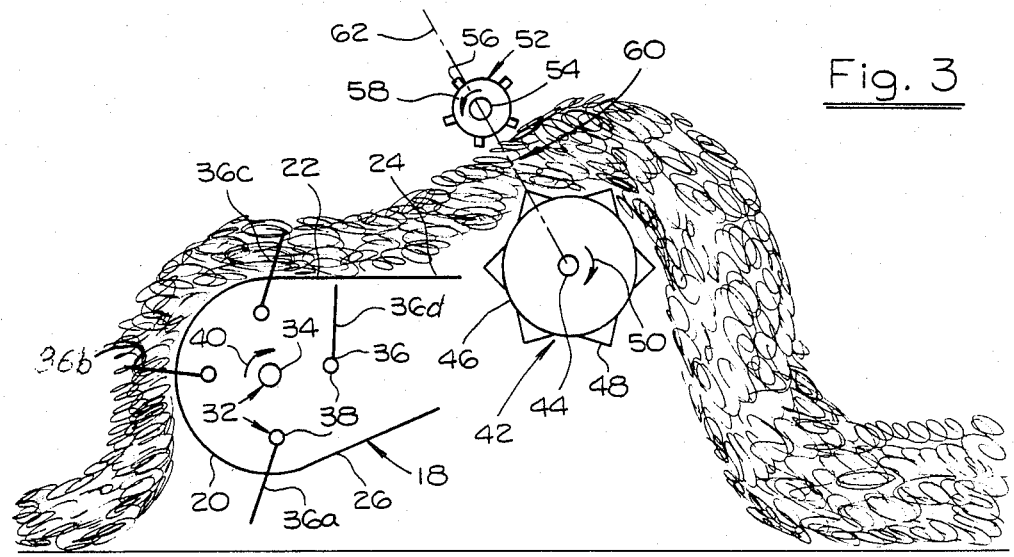
FIG. 3 is a semidiagrammatic view, from the side, showing the main components of the implement, and a windrow.

The pickup head 18 includes an interior rotor 32 of known kind mounted on a transverse shaft 34 and including tines 36 on transverse bars 38, the tines passing through the slits 30. In the normal operation of the pickup head, the rotor 32 rotates as indicated by the arrow 40, clockwise as viewed in FIG. 3, and the tines 36 at the bottom extend downwardly as indicated at 36a nearly to the ground, continuing at the front to a position approximating the horizontal as indicated at 36b, and continuing around to the top where they are in upward position as indicated at 36c, remaining extended through the slits. They then pull out of the hay while remaining upright, so as not to disturb the hay, this step being indicated by their upward position as shown at 36d. This action of the tines is of known character.

Mounted rearwardly of the pickup head is a large roller 42 mounted on a transverse shaft 44. This roller includes a cylindrical member 46 and a plurality of ribs or bars 48 thereon. The ribs 48 may be in the form of angle irons secured to the cylindrical element, being in the form of triangles with the base at the cylindrical element and the apex extending outwardly. These ribs are spaced apart with surfaces of the cylindrical element exposed therebetween. The ribs 48, while being similar to teeth, form in effect a serrated surface, but are relatively blunt, for frictionally engaging the hay in the windrow and moving it rearwardly without however entangling with it or unduly disturbing it. The large roller 42 rotates as indicated by the arrow 50, or clockwise as viewed in FIG. 3.

The large roller 42 is placed at a predetermined vertical position relative to the pickup head 18, the axis thereof being adjacent the top surface 22 and thus the upper part of the roller being exposed above that surface.

The implement includes an upper small roller 52 mounted on a transverse shaft 54. This roller is provided with a plurality of axially extending ribs 56 of relatively small radial dimension, this roller rotating according to the arrow 58, or counterclockwise as viewed in FIG. 3.

Figure 2:
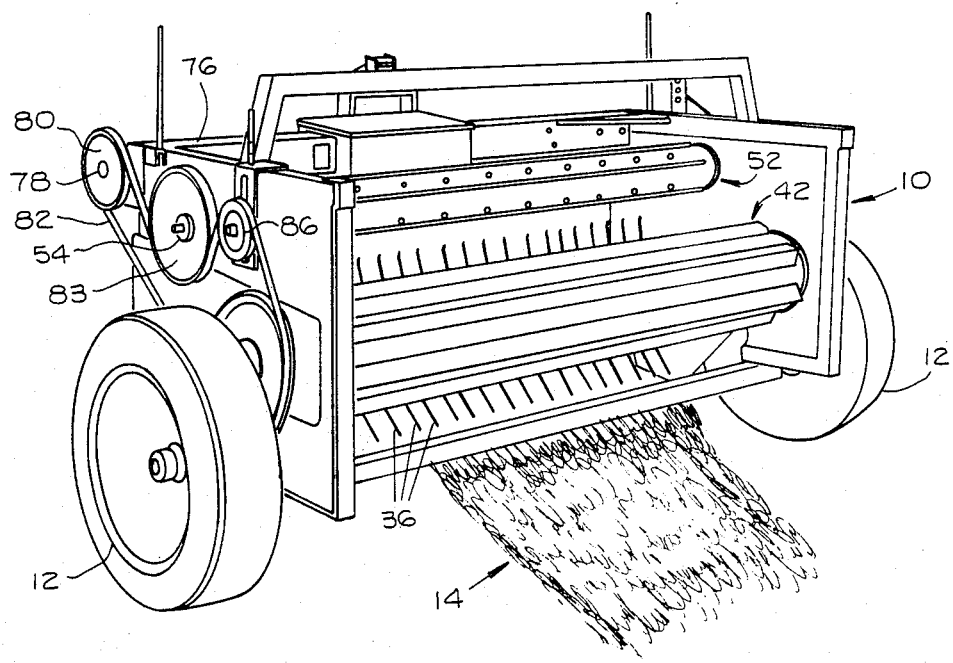
FIG. 2 is a perspective view of the implement from the left and rear.

The upper roller 52 is spaced above and forwardly of the lower large roller, preferably to a position at which it overlaps rearwardly, to a small extent, over the lower roller. There is a substantial gap 60 between the rollers. The line 62 indicates a common plane containing the axes of the rollers, this plane being inclined upwardly and forwardly from the lower roller. The lower roller 42 constitutes the rearmost operating component of the implement, i.e., other than the side plates of the frame (FIG. 2).

The frame includes a tongue 64 by which it is drawn as by a tractor, and other suitable instrumentalities such as a levelling jack 66.

Figure 4:
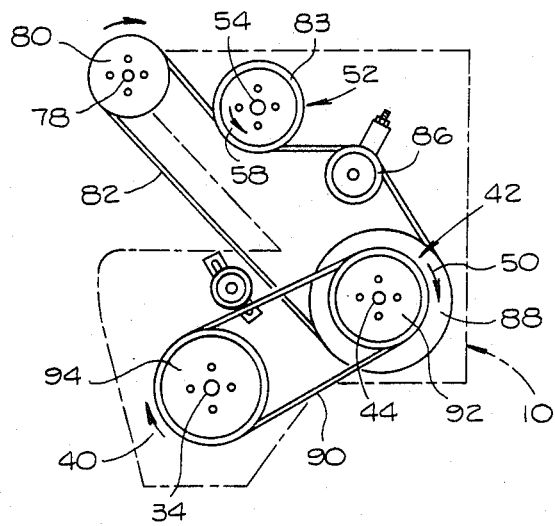
FIG. 4 is a view of the drive connections for driving the main components of the implement.

The rotating members of the implement are driven by a power takeoff (p.t.o.) from the tractor in order to provide uniform and consistent drive of those rollers despite any irregular movements of the implement as a whole. The p.t.o. unit is indicated at 68 having a front shaft 70 connected directly with the p.t.o. unit of the tractor, a second shaft 72, and a universal joint 74. The frame includes a transverse element 76 enclosing a shaft 78 driven by the p.t.o., and extending to the exterior at the left side of the machine, where a drive pulley 80 is mounted thereon. FIG. 4 shows this drive pulley and other drive pulleys. A drive belt 82 is trained on the drive pulley 80, passing under a pulley 83 on the shaft 54 of the upper roller 52. The belt continues over a belt tightener pulley 86 and then over a pulley 88 on the shaft 44 of the lower roller 42. Another belt 90 is trained on a pulley 92 also on the lower roller 42, and on another pulley 94, on the shaft 34 of the pickup head.

Figure 5:
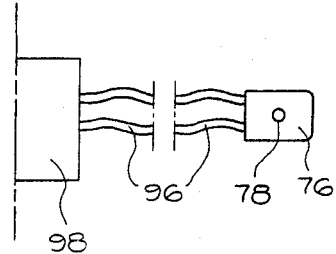
FIG. 5 is a fragmentary diagrammatic view of a hydraulic drive, constituting an alternative form of drive.

The foregoing p.t.o. drive is of mechanical nature, but if desired, a p.t.o. of hydraulic character may be used instead. FIG. 5 shows such a hydraulic drive. In the latter figure the transverse frame element 76 is shown, in which the shaft 78 is mounted. Hydraulic hoses 96 lead from the hydraulic drive 98 of the tractor to a hydraulic drive motor in the frame element, driving the shaft 78.

In the operation of the windrow aerator, it is drawn along the windrow as stated above, the pickup head 18 lifting the windrow bodily and carrying it upwardly to the top of the pickup head and onto the top surface 22. At this point, the tines 36 sweep or scrape along the ground and penetrate into the windrow and lift it as stated. The mass of hay on the top surface 22 then carries rearwardly, by the action of the hay ahead of it pushing it rearwardly, where it engages the lower roller 42. The height of the lower roller is such, referred to above, that it extends above the surface 22 and engages the hay and lifts it, but to a relatively small extent. The arrangement of the lower roller whereby it extends above the surface 22, provides a more positive action in gripping the hay.

The position of the upper roller 56, as referred to above, above and forwardly of the lower roller, positions the gap 60 so that the hay tends to pass therethrough, by the action of the lower roller, but also by the cooperative action of the upper roller, the upper roller tending to confine the hay in its intended path of movement, and to prevent any stray movement above the lower roller. The hay continues rearwardly of the lower roller, by the action of the lower roller and the action of the hay ahead of it pushing it, and it drops from the lower roller directly onto the ground. In this action the windrow is lifted bodily and the hay is not disturbed relative to internal longitudinal axes, that is, it is not twisted or turned about such axes, but merely lifted and moved through the implement. The action is devoid of any objectionable disturbing action, such as breaking the elements of the hay, and particularly it does not beat the leaves off of the stalks. This latter feature is considered to be an extremely great advantage.

Figure 6:
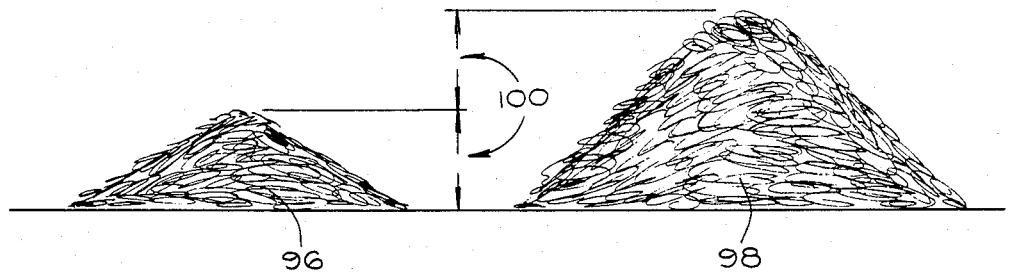
FIG. 6 is a view showing windrows respectively before and after being treated by the implement.

The action of the windrow aerator is indicated in FIG. 6, showing two windrows 96 and 98, or one window before and after being aerated. The windrow 96 at the left is relatively low, having reached this condition through settling or compacting as by rain or merely the lapse of time. The compacted condition prevents or impedes the movement of the air through the stalks and leaves. The windrow 98 at the right is in the condition after being aerated, the hay, including the stalks and leaves being fluffed up, leaving much greater space therebetween, and after it is fluffed up and deposited again on the ground, it assumes a height generally of at least twice the height of the windrow before it was fluffed. This relation is shown by the depth indications 100 in FIG. 6. It has been found, upon using the implement of the invention, that hay in windrows after being fluffed by the implement, will dry a full day before hay as in the windrow before it was fluffed.

The implement is extremely simple, both as to design and construction, and in its operation. Its light weight requires a small amount of power, and the simplicity of its operation similarly requires a minimum of power. Additionally, its simplicity results in a much less expensive implement than any known heretofore.

The p.t.o. drive provides an added advantage in maintaining the windrow intact. Due to the relatively great speed at which the implement may be drawn, it may tend to bounce, and any drive from the wheels in such a case would tend to cause erratic movement of the moving parts of the machine, but in the use of a p.t.o. drive, the movement of the pickup head and rollers is constant, and the movement of the windrow is held substantially the same as the forward speed of the implement. The peripheral speed of the rotating components of the implement is close to the forward speed of the implement, and thus the relative rearward movement of the windrow, thus minimizing any damage to the hay that may otherwise tend to be caused.

I claim:

1. An implement for producing an aerating effect in hay in a windrow comprising,
    a transverse frame mounted on wheels adapted to be drawn along the windrow, with the wheels straddling the windrow, and the frame disposed thereabove,
    the implement including operating components mounted in the frame and extending transversely therein and on transverse axes, and encompassed between a leading edge and a trailing edge,
    one of the operating components being a pickup head at and forming the leading edge and having a rounded leading surface merging into a flat top surface extending rearwardly therefrom adjacent the horizontal, the pickup head including a rotor having tines operative for picking up the hay in the windrow and moving it up and onto the top surface and operative for extending into the hay on the top surface in generally vertical direction and being withdrawn therefrom in direction linearly of the tines,
    a second of the components being a lower roller at the rear of the top surface of the pickup head and extending at least as high as that top surface, and also being disposed at and forming said trailing edge, and
    a third of the components being an upper roller positioned generally above and spaced from the lower roller and with a front surface at least as far forward as the front surface of the lower roller,
    the pickup head and the lower roller being the only means forming an upwardly directed means for supporting the hay,
    the implement including means for driving said components pursuant to the implement being drawn along the windrow,
    the upper roller being the only means above said top surface of the pickup head and the lower roller that engages the hay on the upper side of the hay,
    the three components mentioned constituting the sole means for conducting hay through the implement, and being operative for picking up the hay from the ground by the pickup head and moving it onto and rearwardly along the top surface, and moving it through the space between the rollers, and over the second roller and moving it therefrom directly onto the ground.

2. An implement according to claim 1 wherein,
    the lower roller is positioned longitudinally closely adjacent the top surface of the pickup head, and positioned with its axis adjacent to that surface, and thereby its upper part above the top surface of the pickup head, and the upper roller being positioned with its front surface ahead of the front surface of the lower roller, whereby the space between the rollers forms a path inclined upwardly and rearwardly from a location at the rear end of the top surface of the pickup head, whereby the rollers lift the hay from the top surface of the pickup head, and grip it and move it over the lower roller, onto the ground.

3. An implement according to claim 2 wherein, the upper roller is of substantially lesser radius than the lower roller.

4. An implement according to claim 3 wherein, each the lower roller and the upper roller has a serrated surface including a basic surface of cylindrical shape and circumferentially spaced rigid ribs having a radius substantially less than that of the cylindrical shape, whereby to effectively eliminate penetration of the ribs into the hay.

* * * * *